US009418167B2

(12) United States Patent
Johnston

(10) Patent No.: US 9,418,167 B2
(45) Date of Patent: Aug. 16, 2016

(54) SYSTEM AND METHOD FOR INVOKING WEB SERVICES FROM COMMAND-LINE PROGRAM

(71) Applicant: CA, Inc., Islandia, NY (US)

(72) Inventor: Eugene E. Johnston, Pittsburgh, PA (US)

(73) Assignee: CA, Inc., New York, NY (US)

( * ) Notice: Subject to any disclaimer, the term of this patent is extended or adjusted under 35 U.S.C. 154(b) by 620 days.

(21) Appl. No.: 13/648,914

(22) Filed: Oct. 10, 2012

(65) Prior Publication Data

US 2014/0101291 A1   Apr. 10, 2014

(51) Int. Cl.
*G06F 15/16* (2006.01)
*G06F 17/30* (2006.01)

(52) U.S. Cl.
CPC ................. *G06F 17/3089* (2013.01)

(58) Field of Classification Search
CPC ... H04L 65/60; H04L 67/10; G06F 17/30905; G06F 17/3089; G06F 15/16; H04N 19/162
USPC .................................. 709/219, 100
See application file for complete search history.

(56) References Cited

U.S. PATENT DOCUMENTS

| | | | | |
|---|---|---|---|---|
| 6,907,455 | B1* | 6/2005 | Wolfe | H04L 67/26 704/260 |
| 7,055,143 | B2* | 5/2006 | Ringseth et al. | 717/143 |
| 7,502,999 | B1* | 3/2009 | Saiyed | 715/249 |
| 7,711,849 | B2* | 5/2010 | Stark et al. | 709/239 |
| 8,447,829 | B1* | 5/2013 | Geller et al. | 709/217 |
| 2003/0056004 | A1* | 3/2003 | Argentieri | H04L 29/06 709/238 |
| 2003/0177207 | A1* | 9/2003 | Nagasaka et al. | 709/220 |
| 2008/0299953 | A1* | 12/2008 | Rao | G06Q 10/10 455/414.1 |
| 2009/0222525 | A1* | 9/2009 | Jayawant Pattan | 709/206 |
| 2009/0300431 | A1* | 12/2009 | Ahn | 714/48 |
| 2011/0196914 | A1* | 8/2011 | Tribbett | G06F 9/541 709/203 |
| 2012/0253814 | A1* | 10/2012 | Wang | G06F 17/30905 704/260 |
| 2014/0344403 | A1* | 11/2014 | Arnault | H04L 67/32 709/217 |

OTHER PUBLICATIONS

Surridge, M. ; Taylor, S. ; De Roure, D. ; Zaluska, E., Experiences with GRIA—Industrial Applications on a Web Services Grid, Jul. 5-8, 2005, IEEE, First International Conference on e-Science and Grid Computing, 2005. pp. 98-105.*

Anderson, D.P. ; BOINC: a system for public-resource computing and storage; Nov. 8, 2004, IEEE, Fifth IEEE/ACM International Workshop on Grid Computing, 2004.; pp. 4-10.*

Thomas, M. ; Mock, S. ; Boisseau, J., Development of Web toolkits for computational science portals: the NPACI HotPage, Aug. 1, 2000-Aug. 4, 2000, IEEE, High-Performance Distributed Computing, 2000; The Ninth International Symposium on Proceedings; pp. 308-309.*

* cited by examiner

*Primary Examiner* — June Sison
*Assistant Examiner* — Dixon Dabipi
(74) *Attorney, Agent, or Firm* — Baker Botts L.L.P.

(57) ABSTRACT

A method for invoking web services includes invoking a command-line program. The program receives a plurality of parameters. The method further includes generating a web service request based on the plurality of parameters. The web service request comprises an extensible markup language (XML) document, and the XML document comprises information indicating an application command. The method also includes transmitting the web service request to a server using a network communication protocol.

8 Claims, 2 Drawing Sheets

SYSTEM AND METHOD FOR INVOKING WEB SERVICES FROM COMMAND-LINE PROGRAM

BACKGROUND

The disclosure relates generally to invoking web service calls, and more specifically, to invoking web service calls from a command-line program.

SUMMARY

According to one embodiment of the disclosure, a method for invoking web services includes: invoking a command-line program; receiving a plurality of parameters via the command-line program; generating a web service request based on the plurality of parameters, the web service request comprising an extensible markup language (XML) document, and the XML document comprising information indicating an application command; and transmitting the web service request to a server using a network communication protocol.

According to another embodiment of the disclosure, a method for invoking web services includes invoking a command-line program; receiving a plurality of parameters via the command-line program; generating a web service request based on the plurality of parameters; transmitting the web service request to a server using a network communication protocol; and retrieving a web service response comprising an XML document.

According to still another embodiment of the disclosure, a computer based system for invoking web services includes one or more processors; and a memory including logic operable to: invoke a command-line program; receive a plurality of parameters via the command-line program; generate a web service request based on the plurality of parameters, the web service request comprising an extensible markup language (XML) document, and the XML document comprising information indicating an application command; and transmit the web service request to a server using a network communication protocol.

According to another embodiment of the disclosure, a computer based system for invoking web services includes one or more processors; and a memory comprising logic operable to: invoke a command-line program; receive a plurality of parameters via the command-line program; generate a web service request based on the plurality of parameters; transmit the web service request to a server using a network communication protocol; and retrieve a web service response comprising an XML document.

Other objects, features, and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

DETAILED DESCRIPTION

Figure 1:
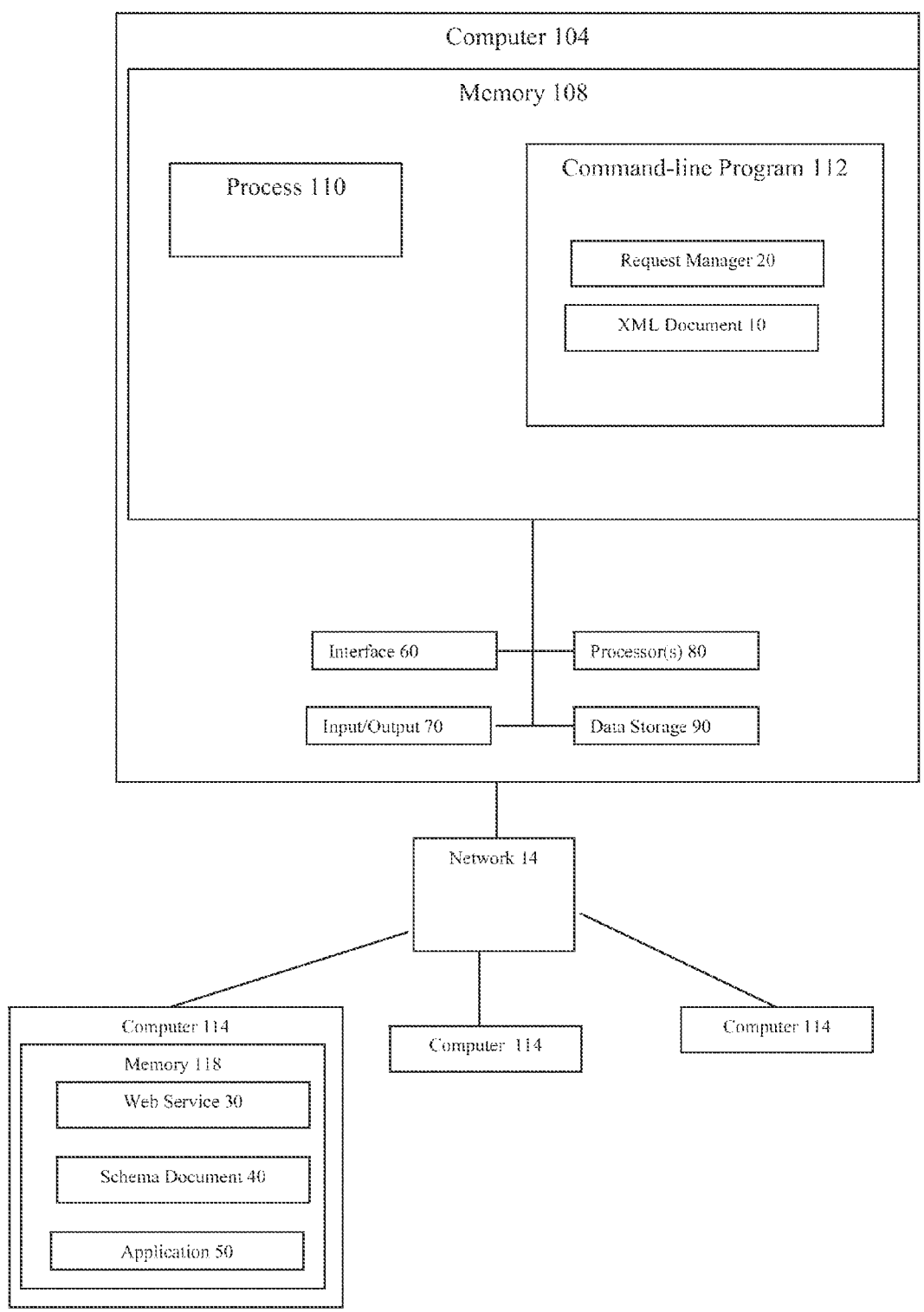
FIG. 1 illustrates a diagram of a system for invoking web services in accordance with a particular configuration.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc, or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed may direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Service oriented architectures may enable application reuse by exposing service functionality across platforms via a network. Businesses may host applications on several computing platforms such as WINDOWS, Unix, and LINUX. These platforms may not be compatible and may not be designed to allow access to applications running on a different platform. Developing web services that conform to the representational state transfer ("REST") architecture may ensure that those services may be accessed with standards based methods like hypertext transfer protocol ("HTTP") methods. However, taking advantage of such services may require a development background and, further, an in depth knowledge and understanding of HTTP. IT staff generally may deploy and may integrate applications using command-line tools and scripting languages. Thus, they may not be experienced in writing complex application software or in writing applications that leverage HTTP.

An organization's inability to leverage service oriented architectures may produce inefficiencies. When businesses host applications on incompatible platforms, users or applications running on one platform may not communicate with applications hosted on other platforms. A duplicate application may be deployed on each platform to ensure compatibility. Moreover, redundant applications may duplicate development and maintenance effort. An upgrade to one application may require development and deployment on multiple platforms. Such a configuration may waste resources and produces maintenance inefficiencies.

The disclosure may be allow a programmer to implement web services using a command-line program without having knowledge of TCP/IP socket programming or Transport Layer Security programming. Methods of the disclosure may be used to substitute runtime data into a template XML document which may be read from disk. These methods may present a technical advantage by alleviating the programmer responsibility of forming an entire, grammatically correct, XML document within application logic. Simplifications to the programming effort embodied in the disclosure to send REST web service requests may increase customer adoption of web services provided by various software-as-a-service applications.

Referring to FIG. 1, a system 100 for invoking web services from a command-line program may be implemented in one or more computers, e.g., one or more of a personal computer, a server, a mobile device, or the like. System 100 may comprise computers 104 and 114. Computers 104 and 114 may interact in system 100 such that computer 104 may invoke a command on an application 50 in computer 114.

Computer 104 may comprise a memory 108 running a command-line program 112 and a process 110. Process 110 may call a command-line program 112 with a plurality of parameters. Command-line program 112 may generate an XML document 10. XML document 10 may include an application command. For example, the XML document 10 may include one or more of information indicating a recipient, a message, an inquiry for the recipient, and a response to be selected by the recipient. Command-line program 112 may comprise a request manager 20. Request manager 20 may send a request to computer 114. Computer 114 may comprise a memory 118 running a web service 30. Web service 30 may store a schema document 40 and may receive the request. Web service 30 may parse XML, document 10 for the application command, using schema document 40, and may execute the application command on an application 50. In another embodiment, web service 30 may parse XML document 10 for information that may include, for example, one or more of information indicating the recipient, the message, the inquiry for the recipient, and the response to be selected by the recipient, and may execute a notification command on application 50. The notification command may comprise information from XML document 10. Application 50 may send a notification to a recipient that may correspond to the recipient in XML document 10 when the notification command is executed on application 50. The notification may comprise a message that may correspond to the message to the recipient in XML document 10. The notification may further comprise an inquiry that may correspond to the inquiry in XML document 10. The notification may further comprise a response to be selected by the recipient that may correspond to the response to be selected by the recipient in XML document 10.

Figure 2:
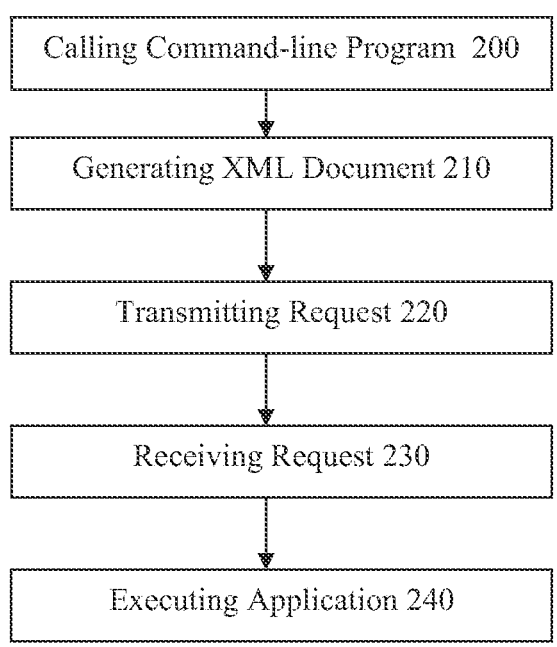
FIG. 2 illustrates a flowchart depicting a method for invoking web services in accordance with a particular configuration.

FIG. 2 illustrates a flowchart depicting a method for invoking web services from a command-line program in accordance with a particular configuration. The method may be implemented in a network comprising one or more computers, e.g., a personal computer, a server, a mobile device, or a system such as system 100 depicted in FIG. 1. A computer may execute the method to invoke an application command. In particular, the computer may invoke an application command on another computer connected to the network.

At step 200, Process 110 may call command-line program 112 with a plurality of parameters. Process 110 may be a user interface (UI) operating system command prompt, such as a WINDOWS command prompt. Process 110 may further be an operating system process, e.g., a batch process, script, or other program.

Command-line program 112 may implement a client-side web service protocol that may be required to transmit a web service request. Command-line program 112 may be configured to provide efficient way to send a web service request to web service 30 from an operating system command-line. Command-line program 112 may invoke HTTP methods such as GET, POST, and PUT against a well defined hierarchy of URIs that may represent web service 30 objects such as, for example, notifications, sessions, and messages. The meaning of an action may be determined by the specified URI. The base name of a URI may be targeted to the web service 30 web server on a local host may be http://localhost:8080. If the server is secured with TLS (SSL), the base URI may be https://localhost:8443. Typically, a specific remote web server host name and possibly a non-default port number may be used. The remainder of the URI may reflect a resource of interest, for example: http://localhost:8080/apwebsvc/notifications.

For example, through command-line program 112, operations such as the following may be performed:
send a notification;
get the status of a notification;
answer a notification;
get the properties of a session;
connect or disconnect a session;
automate or pause a session;
get messages received by a session;
submit a message into a session to be processed by web service 30 rules; or
submit a command into a session.

However, the disclosure is not limited to the specific enumeration of functions listed above.

The details of a request, or application command, may be communicated using XML documents. Each such XML document may be defined in an XML schema. All of the schema definition files may be contained in a subdirectory of computer 114 file system. Command-line program 112 may output an HTTP status code as a first line of standard output. The HTTP status code may identify the success or failure of the request. Command-line program 112 may then output an XML reply document (if one is returned) from the request. In accordance with one embodiment, command-line program 112 may exit with one of the following exit codes:
0=The request succeeded.
1=The request failed.
2=Invalid parameters were specified and the request was not attempted.

On WINDOWS, an exit code may be obtained from the % ERRORLEVEL % environment variable. On LINUX, an exit code may be obtained from the $? environment variable. Detailed information about any error may be contained in the XML document that may be output when an error occurs.

In another embodiment, command-line program 112 action URI may have the following syntax:

```
[ -help ]
[ -xmlfile XmlFileName ]
[ -replacexml "PlaceholderString=ReplacementString" ]
[ -user Username [-password Password] | -credfile CredFileName ]
[ -output OutputStyle ]
```

In certain embodiments, command-line program 112 may comprise the following positional parameters:
action This flag may indicate an action to take against the specified URI may be one of 'get', 'put', or 'post', 'delete', 'options', or 'head'.

URI

This flag may indicate a URI that may identify a web service 30 resource against which to take the action. Spaces may exist within the URI. Command-line program 112 may automatically replace spaces with the '%20' URI encoding character prior to sending the request to the web server. However, the command-line interpreter of an operating system may require enclosing a URI parameter that may have embedded spaces in quotes. In addition to the resource name, some 'get' commands may accept a query string (specified by appending a '"?"' and a query to the end of the resource name). Multiple query options may be separated by the '&' character. The special characters used within a query string may require enclosing the URI in quotes, or otherwise escaping special characters designated by the operating system's command-line interpreter.

In certain embodiments, command-line program 112 may comprise the following optional flags:
-credfile CredFileName This flag may indicate a file name containing the credentials, e.g., username and password, that may be used to authorize a user's rights to perform a specified action on a specified resource. The credentials may be read from the specified file. The file may be formatted as a Java properties file. A username and password may be specified within the file as follows:
user=YourUserName
password=YourPassword The -credfile option may be mutually exclusive with the -user and -password options,
-help This flag may indicate an option to display help text. Help may also displayed when command-line program 112 is run with no parameters. When help is displayed, no other operation may be performed. Help may appear in a pop-up GUI window by default. If the -output option is also supplied, its value may be obeyed. When a GUI environment is unavailable, help may be displayed on standard output regardless of the value of the -output option.

-output OutputStyle

Command-line program 112 may output the HTTP status code on one line, and may output the XML document containing the reply to the request on a separate line. The value of -output may be one of:
stdout—Display to standard output (command window). This is the default for replies from requests.
gui—Display output in a pop-up dialog.

-password Password

This flag may indicate the password for the supplied user name that may be used to determine the user's rights to perform the specified action on the specified URI. If the -username option is specified without a -password option, a GUI window may be displayed to interactively ask the user for the password. The -password option may be specified in clear text on the command-line. Thus, it may be visible to anyone who may view the process list on the machine. The -password option may only be used for testing or when a sitemay ensure that no unauthorized agent may view the process list on the machine running this program.

-replacexml "PlaceholderString=ReplacementString"

This flag may indicate an option to replace a specified placeholder string in XML document 10 with a replacement string. It may enable creation of template XML files and may use runtime substitution. Every PlaceholderString found in XML, document 10 may be replaced with ReplacementString. Multiple -replacexml options may be specified. The -replacexml option may only be processed if the -xmlfile option is specified. Quotes may be necessary if blanks exist within the text.

-user Username

This flag may indicate the username that may be used to determine the rights to perform the specified action on the specified URI. Since the user name may be passed as part of the HTTP basic authentication header, the username may not contain a colon (:). When a -user option is specified, either the -password option must also be specified, or the user may be interactively asked for the password. The -user and -password options may be mutually exclusive with the -credfile option.

-xmlfile XmlFileName

This flag may indicate a file name of an XML request document that may contain the required content for the desired action. Specifying the literal 'stdin' may signal that an XML document may be provided on the standard input stream to command-line program 112. XML document 10 may be required for a POST or PUT action. If the -xmlfile option is not specified for those actions, the request may be rejected with an error. For all other actions, no XML document 10 may be used. If the -xmlfile parameter is specified for any action other than POST and PUT, the request may be rejected with an error.

At step 210, command-line program 110 may generate XML document 10. Computer 104 may run command-line program 112 configured to make web service calls during execution. Computer 104 may store XML document 10 in one or more of data storage 90, and memory 108 during one or more of command-line program 112 runtime, installation, and function execution. Command-line program 112 may load XML document 10 into memory 108 when called by Process 110. Command-line program 112 may replace placeholders within XML document 10 with parameters received when command-line program 112 was invoked. The XML document may contain an application command. The application command may contain information indicating an application and information indicating a command to invoke. In still other embodiments, XML document 10 may include one or more of information indicating a recipient, a message, an inquiry for the recipient, and a response to be selected by the recipient.

The application command may comprise information indicating application 50, and information indicating the application command to be executed on application 50. Web service 30 may parse the application command information from XML document 10, and may search memory 118 for processes that may match the information indicating application 50. In another embodiment, the application command may comprise a combination of one or more of application names, parameters, arguments and constraints. In still other embodiments, XML document 10 may include one or more of information indicating a recipient, a message, an inquiry for the recipient, and a response to be selected by the recipient.

XML document 10 may be stored in data storage 90, and may be loaded into memory 108 by command-line program 112. In another embodiment, command-line program 112 may create XML document 10 and may store it in memory 108. Command-line program 112 may generate XML document 10. In another embodiment, different applications may generate XML document 10, or XML document 10 may be generated during command-line program 112 installation.

At step 220, command-line program 112 may transmit a request through a network using request manager 20. The request, may be an HTTP request, and may include one or more of a URI, a query string, and a plurality of HTTP header fields. The HTTP header fields may comprise one or more of a user name and password. Other parameters may be included in the query string that may specify attribute values that may limit the set of affected resources without departing from the scope of the disclosure. The XML document, may be embedded in the body of the HTTP POST request.

Request manager 20 may receive parameters from command-line program 112. The parameters may include one or more of a uniform resource identifier (URI), a hyper-text transfer protocol (HTTP) method, a user name, a password and XML document 10. The URI may comprise an internet protocol (IP) address of computer 114, a port, number indicating a port on computer 114 and a path indicating a path in the web server directory structure of computer 114 that may correspond to web service 30. In another embodiment, the URI may comprise a domain name of computer 114 and a path to web service 30. The domain name may be resolved to the IP address of computer 114 by a domain name server. The HTTP method may indicate the action to be performed on the resource specified by the URI. The HTTP method may include HEAD, GET, POST, OPTIONS, or any other HTTP method for which web service 30 is configured to act on. The user name may be associated with a user running command-line program 112. The user name may be a network service user, a generic web user, or any other user that may be authorized to access web service 30. The password maybe encrypted in command-line program 112, decrypted in web service 30 and may be used to authenticate the request. The password may be encrypted and decrypted using a public shared key or any other encryption/decryption algorithm. In another embodiment, the password may not be encrypted.

Request manager 20 may create a request using the parameters from command-line program 112. The request may be an HTTP request that may be sent to the URI. Request manager 20 may modify the URI to include query string parameters. The HTTP header fields may comprise one or more of the user name and password. Other parameters may be included in the query string that may specify attribute values that may limit the set of affected resources without departing from the scope of the disclosure. Request manager 20 may include parameters in an HTTP header field or body. For example, request manager 20 may include XML document 10 in the HTTP request body when the request is using the POST HTTP method. HTTP header fields may include complex character strings.

A URI may represent a resource upon which operations may be performed. The meaning of an HTTP method may be determined by the specified URI. For example, the base name of a URI targeted to a web service running under an application server on a local machine may be: https://localhost:8443/apwebsvc. A specific host name may be used by a client application running on another computer. Further, a site may choose to configure an application server to use a non-default port number. The remainder of the URI may reflect the resource of interest.

A URI may contain a query string that may contain non-hierarchical data that, along with data in the path component, may serve to identify a resource within the scope of the URI's scheme and naming authority. Request manager 20 may modify the URI to include the parameters in the query component of the URI, such that the URI may pass parameters from resource manager 20 to web service 30. The query component may be indicated by the first question mark ('?') character and may be terminated by a number sign ('#') character or by the end of the URI. Query components may be used to carry identifying information in the form of "key=value" pairs.

The URI may have multiple query options separated with an ampersand character ('&') character as in the following example: URI-path?option1=value&option2=value2. When an unknown query option is specified, the operation may return an HTTP status error of 400 (Bad Request). If an otherwise valid query option is specified, which is not applicable due to a conflict with another query option, the non-applicable option may be ignored and the operation may be processed.

Within some query strings, a pattern-matching expression may be used as the value of a query option. Examples of the pattern-matching expression format that web service 30 may recognize are:

| Character | Meaning |
| --- | --- |
| . | Matches any one character |
| * | Matches any zero or more characters |

The '\' character may serve as an escape character. The following escape sequences may be recognized:

| Character Sequence | Meaning |
| --- | --- |
| \. | Matches the '.' character |
| \* | Matches the '*' character |
| \\ | Matches the '\' character |

Any other escape sequence may be treated as an error. For example, the string "AX\C" may be an invalid pattern.

Request manager 20 may comprise one or a plurality of code objects, and may be instantiated and referenced by other code objects associated with command-line program 112 or any other application running on computer 104.

Web service 30 actions may require an XML, request document and may return an XML response document. XML schemas that may define the formats of all of these documents may be contained in a directory. For example, schema documents 40 may be stored in the 'InstallationDirectory\distrib\websvc' directory.

At step 230, web service 30 may receive the request, and may authenticate the request. If the request is authenticated successfully, web service 30 may parse request body for the XML document. Web service 30 may use the schema document to retrieve information from the XML document. In another embodiment, the schema document may be used to de-serialize the XML document into a code object that web service 30 may understand.

Computer 114 may execute web service 30 and a web server in memory 118. The web server may be configured to listen to traffic on an open port, and may forward requests to web service 30. Web service 30 may comprise application code configured to receive requests and execute application commands based on those requests. Web service 30 may comprise one or a plurality of code objects, and may be instantiated and referenced by other code objects running on computer 114.

Web service 30 may receive the request from request manager 20. The request may be an HTTP request, which may trigger execution of logic in web service 30. Web service 30 may parse the request for parameters that may include the user name, the password, and XML document 10, and may authenticate the request based on one or more of the parameters. Web service 30 may decrypt the password using a public shared key or any other encryption/decryption algorithm. If the request is not authorized, web service 30 may return a response indicating that an error occurred.

Schema document 40 may define an XML schema and may be an extensible markup language schema document (XSD). Schema document 40 may be stored in data storage on computer 114, and may be stored in memory 118 by web service 30. In another embodiment, web service may create schema document 40 and may store it in memory 118. Web service 30 may store schema document 40. In another embodiment, different applications may store schema document 40, or schema document 40 may be stored during web service 30 installation. In another embodiment, web service 30 may de-serialize XML document 10 into a code object based on schema document 40.

Web service 30 may parse information from XML document 10 based on schema document 40. In certain embodiments, schema document 40 may be an XSD and XML document 10 may have XML, formatting. In those embodiments, XML, document 10 may correspond to schema document 40. If XML document 10 does not conform to schema document 40, web service 30 may return an error message to request manager 20.

The information contained in XML document 10 may include a command. The application command may comprise information indicating application 50, and information indicating a command to run on application 50. Web service 30 may parse the application command information from XML document 10 based on schema document 40, and may search memory 118 for a process that may correspond to the information indicating application 50. In another embodiment, the application command may comprise a combination of one or more of application names, parameters, arguments and constraints. For example, the application command may comprise the name of a notification application, the name of a send notification command, and the name of a group of recipients. Upon receiving the request, web service 30 may invoke the send notification command on the notification application with the name of the group of recipients. The notification application may then send a notification to each recipient in the group of recipients.

In still other embodiments, XML document 10 may include one or more of information indicating a recipient, a message, an inquiry for the recipient, and a response to be selected by the recipient. Web service 30 may search memory 118 for a notification application, and may execute a notification command. The notification command may comprise information from XML document 10 and may send a notification to a recipient that may correspond to the recipient in XML, document 10. The notification may comprise a message that may correspond to the message to the recipient in XML document 10. The notification may further comprise an inquiry that may correspond to the inquiry in XML document 10. The notification may further comprise a response to be selected by the recipient that may correspond to the response to be selected by the recipient in XML document 10.

Web service 30 may execute an application running in memory 118 based on the parameters contained in XML document 10, and may return a return document indicating return information.

For example, web service 30 may comprise a URI that exposes functionality to request notifications, such as: https://localhost:8443/apwebsvc/notifications. This URI may represent the notifications that may have been processed by a notification manager. Sending a request with the GET HTTP method specifying the above URI may return a return document comprising a list of notifications in order from the oldest notification to the latest notification. HTTP query strings may be added to the URI to control the volume and order of returned URIs. Most query options may represent properties of the object that are returned in the reply document. For example, specifying a query string with "AnswerableBy=" may return a return document comprising a contact name that may be allowed to answer the notification. In another example, specifying a query string with "IssuedBy=" may return a return document comprising a name of a login that may have issued the notification. A sample URI using the GET HTTP method to return a return document comprising a list of 10 notifications occurring after the last result returned from the last web service call may resemble the following URI: https://192.168.1.5:8443/apwebsvc/notifications?AfterId=LastIdOfOurPreviousGet&Count=10. In this example, no XML document 10 may be sent.

The examples that follow are presented in the context of a notification system. The disclosure, however, may be operable to call other web service 30 that may be configured to receive HTTP requests.

In another example, the POST HTTP method may be specified in a request to send a notification, XML document 10 may contain characteristics of the notification, such as who may be notified and what the message may be. The XML document may correspond to a schema document. A user name and password may be sent in the HTTP headers of the request. The reply may contain response HTTP headers. A status HTTP header value of 202 may indicate that the request was successful. The reply may also contain a reply document that may contain the URI which may identify the created notification. The URI may also be returned in the HTTP location header.

The following is an example of XML document 10 from system 100 that may be sent in an HTTP POST request:

```
<?xml version="1.0" encoding="utf-8"?>
<NotificationRequest xmlns:xsi="http://www.w3.org/2001/
XMLSchema-instance"
       xsi:schemaLocation="http://www.ca.com/
distauto/ap/websvc/msgData apNotify.xsd"
       xmlns="http://www.ca.com/distauto/ap/websvc/msgData"
       Debug="yes" FailureRexx="ReportError.rex">
  <Name>Mr. Jones</Name>
  <Tell>Howdy Pardner</Tell>
  <Ask>
    <Question>How are you?</Question>
    <Choice>
      <Answer>I am fine</Answer>
    </Choice>
    <Choice>
      <Answer>Life stinks</Answer>
      <Action>CheerMeUp.rex</Action>
    </Choice>
    <EscalateWaitSec>30</EscalateWaitSec>
  </Ask>
  <MethTypesToUse>EVP</MethTypesToUse>
  <AcknowledgeAP>
    <Message>We acknowledge toweb service 30that we
    did our job.</Message>
  </AcknowledgeAP>
  <AcknowledgeOPS>
    <Message>We acknowledge to OPS that we did our job.</Message>
    <Hostname>OpsHostName</Hostname>
```

-continued

```
  </AcknowledgeOPS>
  <AcknowledgeNSM>
    <Message>We acknowledge to NSM that we did our job.</Message>
    <Hostname>NsmHostName</Hostname>
  </AcknowledgeNSM>
  <Attachment>c:\someDir\emailAttachment.txt</Attachment>
  <MethParmOverride>
    <ParmName>SubjectText</ParmName>
    <ParmValue>email notification from AP</ParmValue>
  </MethParmOverride>
  <MethParmOverride>
    <ParmName>cc</ParmName>
    <ParmValue>Mr. Smith</ParmValue>
  </MethParmOverride>
</NotificationRequest>
```

The following may be an example of schema document 40 corresponding to XML, document 10:

```
<xs:element name="NotificationRequest">
  <xs:complexType>
    <xs:sequence>
      <xs:element name="Name" type=" xs:string " minOccurs="1"
        maxOccurs="1"/>
      <xs:element name="Tell" type=" xs:string " minOccurs="1"
        maxOccurs="1"/>
      <xs:element name="Ask" minOccurs="0" maxOccurs="1">
        <xs:complexType>
          <xs:sequence>
            <xs:element name="Question" type=" xs:string "
              minOccurs="1" maxOccurs="1"/>
            <xs:element name="Choice" minOccurs="0"
              maxOccurs="9">
              <xs:complexType>
                <xs:sequence>
                  <xs:element name="Answer" type=" xs:string "
                    minOccurs="1" maxOccurs="1"/>
                  <xs:element name="Action" type=" xs:string "
                    minOccurs="0" maxOccurs="1"/>
                </xs:sequence>
              </xs:complexType>
            </xs:element>
            <xs:element name="EscalateWaitSec" minOccurs="0"
              maxOccurs="1">
              <xs:simpleType>
                <xs:restriction base=" xs:positiveInteger ">
                  <xs:minInclusive value="1"/>
                  <xs:maxInclusive value="3600"/>
                </xs:restriction>
              </xs:simpleType>
            </xs:element>
          </xs:sequence>
        </xs:complexType>
      </xs:element>
      <xs:element name="MethTypesToUse" minOccurs="0"
        maxOccurs="1">
        <xs:simpleType>
          <xs:restriction base=" xs:string ">
            <xs:pattern value="A|[B–W]+"/>
          </xs:restriction>
        </xs:simpleType>
      </xs:element>
      <xs:element name="AcknowledgeAP" minOccurs="0"
        maxOccurs="1">
        <xs:complexType>
          <xs:sequence>
            <xs:element name="Message" type=" xs:string "
              minOccurs="1" maxOccurs="1"/>
          </xs:sequence>
        </xs:complexType>
      </xs:element>
      <xs:element name="AcknowledgeOPS" minOccurs="0"
        maxOccurs="1">
        <xs:complexType>
          <xs:sequence>
            <xs:element name="Message" type=" xs:string "
              minOccurs="1" maxOccurs="1"/>
```

```
            <xs:element name="Hostname" type=" xs:string "
                    minOccurs="1" maxOccurs="1"/>
        </xs:sequence>
    </xs:complexType>
</xs:element>
<xs:element name="AcknowledgeNSM" minOccurs="0"
        maxOccurs="1">
    <xs:complexType>
        <xs:sequence>
            <xs:element name="Message" type=" xs:string "
                    minOccurs="1" maxOccurs="1"/>
            <xs:element name="Hostname" type=" xs:string "
                    minOccurs="0" maxOccurs="1"/>
        </xs:sequence>
    </xs:complexType>
</xs:element>
<xs:element name="Attachment" minOccurs="0"
        maxOccurs="1">
    <xs:simpleType>
        <xs:restriction base=" xs:string ">
            <xs:whiteSpace value="preserve"/>
            <xs:maxLength value="512"/>
        </xs:restriction>
    </xs:simpleType>
</xs:element>
<xs:element name="MethParmOverride" minOccurs="0"
        maxOccurs="unbounded">
    <xs:complexType>
        <xs:sequence>
            <xs:element name="ParmName" minOccurs="1"
                    maxOccurs="1">
                <xs:simpleType>
                    <xs:restriction base=" xs:string ">
                        <xs:whiteSpace value="collapse"/>
                    </xs:restriction>
                </xs:simpleType>
            </xs:element>
            <xs:element name="ParmValue" minOccurs="1"
                    maxOccurs="1">
                <xs:simpleType>
                    <xs:restriction base=" xs:string ">
                        <xs:whiteSpace value="preserve"/>
                    </xs:restriction>
                </xs:simpletype>
            </xs:element>
        </xs:sequence>
    </xs:complexType>
</xs:element>
</xs:sequence>
<xs:attribute name="Debug">
    <xs:simpleType>
        <xs:restriction base=" xs:string ">
            <xs:enumeration value="yes"/>
            <xs:enumeration value="no"/>
        </xs:restriction>
    </xs:simpleType>
</xs:attribute>
<xs:attribute name="FailureRexx">
    <xs:simpleType>
        <xs:restriction base=" xs:string ">
            <xs:whiteSpace value="preserve"/>
            <xs:maxLength value="512"/>
        /xs:restriction>
    </xs:simpleType>
</xs:attribute>
    </xs:complexType>
</xs:element>
```

XML document 10 may be sent to computer 114 to request sending of a notification. The following optional attributes may be supplied for the 'NotificationRequest' element:

Attribute "Debug" may specify whether debugging messages is to be generated. The possible values for "Debug" are listed below. The 'Debug' attribute may be optional. If the "Debug" attribute is not supplied, the default value may be "no."

yes=Generate debugging messages
   no=Do not generate debugging messages

Attribute "FailureRexx" may specify the name of a REXX program to run when every possible notification action has failed. A "FailureRexx" attribute may be optional. The "FailureRexx" file may be accessible from the server that is issuing the notification.

The REXX program may be an example program, XML document 10 attributes may specify one or more of substitute and additional programs to run during any defined event.

XML document 10 may comprise the following elements.

"Name" element may specify the name of the person or group to be notified. This element may be required.

"Tell" element may specify the text of the notification to be sent. This element may be required.

"Ask" element may specify a question and a set of possible answers. An "Ask" element may be optional. When an "Ask" is specified, a notification may not be considered successful until an answer is received from one of the recipients to which the notification has been sent. The "Ask" element contains the following elements.

"EscalateWaitSec" may specify the number of seconds that the notification may wait after ail notification methods at a given level are exhausted, before escalating the notification. This may give contacts additional time to respond. If there is a response during the wait period, the notification may be considered successful and escalation may not occur. The "EscalateWaitSec" element may be optional. If not specified, the notification may be escalated as soon as all notification methods at the current level have been attempted.

"Question" may specify the question to be asked of the recipient.

"Choice" may specify a combination of answer and optional action that may be taken if the corresponding answer is selected by the recipient. Up to nine choices may be specified. If no choices are specified, two default choices may automatically be utilized: the first choice may be TRUE and the second choice may be FALSE.

"Answer" element may specify the text representing the answer for this choice. One "Answer" element may be specified for an "Choice" element that is specified.

"Action" element may specify the name of a REXX program to be run if this choice is selected by the recipient. An "Action" element may not be required as part of a "Choice" element. These REXX program files may be accessible from the server that is issuing the notification. Each REXX action program may set a return code on exit. The return code value may be either 0 or any number greater than 9.

"MethTypesToUse" element may specify which types of methods are attempted for a particular notification request. The method type for each method may be defined in a database of a notification manager within the "Method Type" parameter. Before attempting to notify a contact using a particular method, a notification manager may compare the value of that method's type with the value of "MethTypesToUse." If the value of the type parameter is part of the "MethTypesToUse" value, then the notification may be attempted using that method. If the type parameter is not part of the "MethTypesToUse" value, then the notification may not be attempted, and the next scheduled method may be compared to the "MethTypesToUse" value. The value of "MethTypesToUse" may be any string of letters from "A" through "W." The value of "MethTypesToUse" may contain the following values:

A=All method types may be used for all active schedules. No comparisons may be made, and all methods may be attempted.

Any combination of method type parameter values B through W

The "MethTypesToUse" element may be optional. If the "MethTypesToUse" element is not supplied, the value "A" may be used as default.

Consider the following scenario. Assume that all email notification methods within the notification system have a method type indicator of "E", and all pager notification methods have a method type indicator of "P". When "MethTypesToUse" contains the value "A", or the value "EP", or "MethTypesToUse" is not supplied (which defaults to "A"), both email and paging types of methods may be used to perform the notification. If "MethTypesToUse" contains only the value "E", only email notification methods may be used. If "MethTypesToUse" contains only the value "P", only paging notification methods may be used.

"AcknowledgeAP" element may specify that an acknowledgement message is to be sent to the server, "Acknowledge AP" may be an optional element. The elements of "AcknowledgeAP" may include "Message" element that may specify the acknowledgement text to be sent. "AcknowledgeOPS" element may specify that an acknowledgement message is to be sent to OPS MVS/EMA. This may be an optional element. The elements of "AcknowledgeOPS" element may include a "Message" element that may specify the acknowledgement text to be sent, and a "Hostname" element that specify the name of the target host which is currently configured and active.

"AcknowledgeNSM" element may specify that an acknowledgement message to be sent to Network and Systems Management. This may be an optional element. The elements of "AcknowledgeNSM" element may include a "Message" element that may specify the acknowledgement text to be sent and a "Hostname" element that may specify the name of the target host. If it's not specified, all hosts configured within the web service 30 server may receive a copy of the acknowledgement message.

"Attachment" element may specify the name of a file that is to be attached to a notification which is sent by a web service 30 email notification method. The file may be accessible from the server that is issuing the notification. One file name may be specified. The maximum length of the filename (including path) may be 512 characters. An "Attachment" element is optional.

"MethParmOverride" element may specify a method parameter name and parameter value that may override any like-named method parameter during the processing of a notification. For example, if the "SubjectText" ParmName is specified, its associated ParmValue may override the parameter "SubjectText" for any method that uses the "SubjectText" parameter. The "MethParmOverride" element may be optional. The "MethParmOverride" element may be specified multiple times to override multiple method parameters.

"MethParmOverride" element may contain "ParmName" element that may specify the name of a method parameter whose value should be overridden and "ParmValue" element that may specify the value to be used for the method parameter.

The HTTP request headers for the POST notifications may comprise an Authorization for supplying a user ID and password in the HTTP Basic Authentication format. The user ID may be a login with the Notify All contacts privilege on the server that is the target of the HTTP method. The HTTP response headers for the OPTIONS notifications may comprise a status indicating Successful result=200=Ok and a Location containing URI to the newly created notification.

At step 240, web service 30 may execute an application that may have been specified in XML document 10. In another embodiment, the web service may execute a predetermined application, using parameters from XML document 10. For example, web service 30 may invoke a send notification command on a notification application using parameters such as message and recipient that may have been retrieved from the XML document. When HTTP requests for the POST notifications are successfully implemented, an XML document of NotificationRequestReply defined in schema NotificationRequest.xsd may be the reply document sent back to the requesting computer. The following may be an example of the XML instance representation of NotificationRequestReply:

```
<?xml version="1.0" encoding="utf-8"?>
<NotificationRequestReply
    xmlns="http://www.ca.com/distauto/ap/websvc/msgData"
    xmlns:xsi="http://www.w3.org/2001/XMLSchema-instance"
    xsi:schemaLocation="http://www.ca.com/distauto/ap/websvc/
    msgData">
    <Notification
        href="http://localhost:8080/apwebsvc/notifications/3735">
        3735
    </Notification>
</NotificationRequestReply>
```

The following may be an example of the schema document 40 corresponding to NotificationRequestReply:

```
<xs:element name="NotificationRequestReply">
    <xs:complexType>
        <xs:sequence>
            <xs:element name="Notification" minOccurs="1"
            maxOccurs="1">
                <xs:complexType>
                    <xs:simpleContent>
                        <xs:extension base=" xs:positiveInteger ">
                            <xs:attribute name="href" type=" xs:anyURI "
                            use="required"/>
                        </xs:extension>
                    </xs:simpleContent>
                </xs:complexType>
            </xs:element>
        </xs:sequence>
    </xs:complexType>
</xs:element>
```

A NotificationRequestReply document may be sent from computer 114 back to a requesting computer in response to the receipt of a "NotificationRequest" document. A "NotificationRequestReply" document may contain an "Notification" element which may contain the numeric ID of the notification that was created by the "NotificationRequest." This may be the same ID used by recipients to identify the notification when they answer a notification. The "Notification" element may contain the "href" attribute which may specify the URI that may be used to access this specific notification in future operations.

The following may be another example of XML document 10:

```
<?xml version="1.0" encoding="utf-8"?>
<NotificationRequest xmlns:xsi="http://www.w3.org/2001/
    XML Schema-instance" xsi:schemaLocation="http://www.ca.com/
    distauto/ap/websvc/msgData NotificationRequest.xsd" xmlns=
    "http://www.ca.com/distauto/ap/websvc/msgData">
        <Name>PersonThatYouWantToNotifiy</Name>
        <Tell>Hi. This is a notification test.</Tell>
</NotificationRequest>
```

In this example, the XML document may request the above Tell element message be sent to the recipient indicated in the Name element.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for invoking web services, the method comprising:
   invoking a command-line program;
   receiving a plurality of parameters via the command-line program;
   generating, via the command-line program, an extensible markup language (XML) document, wherein the XML document comprises a query requiring a selection, wherein the XML document comprises information indicating an application command, wherein the application command comprises a name of a notification application, a name of a send notification command, and a name of a group of recipients;
   replacing a plurality of placeholders in the XML document with the plurality of parameters;
   generating a web service request based on the plurality of parameters and the application command, wherein the web service request comprises the XML document, wherein the web service request indicates a first URI that identifies a web service resource against which to take an action based on the plurality of parameters, wherein the first URI identifies access credentials necessary to perform the action;
   transmitting the web service request to a server using a network communication protocol; and
   receiving a response XML document, wherein the response XML document comprises the selection to the query, wherein the response XML document indicates that a web service executed an application according to the plurality of parameters and the application command, wherein the response XML document comprises a notification answer, wherein the notification answer comprises text associated with an answer, wherein the notification answer comprises information identifying the notification answer, and wherein the notification answer comprises a second URI of a resource representing attributes of the notification answer.

2. The method of claim 1, wherein the XML document further comprises:
   information indicating a recipient; and
   a message.

3. The method of claim 1, wherein the plurality of parameters comprises:
   a HTTP method;
   a uniform resource identifier (URI);
   a file path of the XML document;
   a replacement string;
   a user name;
   a password;
   a file path of a credential file; and
   an output style to display a response.

4. The method of claim 1, wherein the network communication protocol comprises hypertext transfer protocol (HTTP) or HTTP over SSL/TLS (HTTPS).

5. A computer based system for invoking web services, the system comprising:
   one or more processors; and
   a memory comprising logic operable to:
      invoke a command-line program;
      receive a plurality of parameters via the command-line program;
      generate, via the command-line program, an extensible markup language (XML) document, wherein the XML document comprises a query requiring a selection, wherein the XML document comprises information indicating an application command, wherein the application command comprises a name of a notification application, a name of a send notification command, and a name of a group of recipients;
      replace a plurality of placeholders in the XML document with the plurality of parameters;
      generate a web service request based on the plurality of parameters and the application command, wherein the web service request comprises the XML document, wherein the web service request indicates a first URI that identifies a web service resource against which to take an action based on the plurality of parameters, wherein the first URI identifies access credentials necessary to perform the action;
      transmit the web service request to a server using a network communication protocol; and
      receive a response XML document, wherein the response XML document comprises the selection to the query, wherein the response XML document indicates that a web service executed an application according to the plurality of parameters and the application command, wherein the response XML document comprises a notification answer, wherein the notification answer comprises text associated with an answer, wherein the notification answer comprises information identifying the notification answer, and wherein the notification answer comprises a second URI of a resource representing attributes of the notification answer.

6. The system of claim 5, wherein the XML document further comprises:
  information indicating a recipient; and
  a message.

7. The system of claim 5, wherein the plurality of parameters comprises:
  a HTTP method;
  a uniform resource identifier (URI);
  a file path of the XML document;
  a replacement string;
  a user name;
  a password;
  a file path of a credential file; and
  an output style to display a response.

8. The system of claim 5, wherein the network communication protocol comprises hypertext transfer protocol (HTTP) or HTTP over SSL/TLS (HTTPS).

* * * * *